United States Patent

[11] 3,595,376

| [72] | Inventor | Roger R. Tonelli |
| | | Chicago, Ill. |
| [21] | Appl. No. | 794,259 |
| [22] | Filed | Jan. 27, 1969 |
| [45] | Patented | July 27, 1971 |
| [73] | Assignee | Radio Steel & Mfg. Co. |
| | | Chicago, Ill. |

[54] VERTICAL LIFT
8 Claims, 4 Drawing Figs.

[52] U.S. Cl............................................. 198/163,
198/117
[51] Int. Cl.................................................B65g 15/14
[50] Field of Search............................................198/165,
163, 157, 154, 153, 117

[56] References Cited
UNITED STATES PATENTS
1,020,746   3/1912   Dehler.......................... 198/157

| 2,818,156 | 12/1957 | Edwards................... | 198/163 |
| 3,170,564 | 2/1965 | Gatto....................... | 198/165 |

*Primary Examiner*—Richard E. Aegerter
*Attorney*—McDougall, Hersh, Scott & Ladd ABSTRACT: A vertical lift construction for moving articles from one level to another comprising a frame with endless conveyors located on opposite sides of the frame. Each of the conveyors carries a plurality of article supporting elements with the elements moving in the same direction on the inwardly facing side of the conveyors. Articles are adapted to be located on the respective article supporting elements so that the ends only of the articles are supported with the main body of the articles being suspended in unsupported fashion between the article supporting elements. The frames for supporting the conveyors are relatively movable by motorized means so that the span between article supporting elements can be readily changed for handling articles of different sizes.

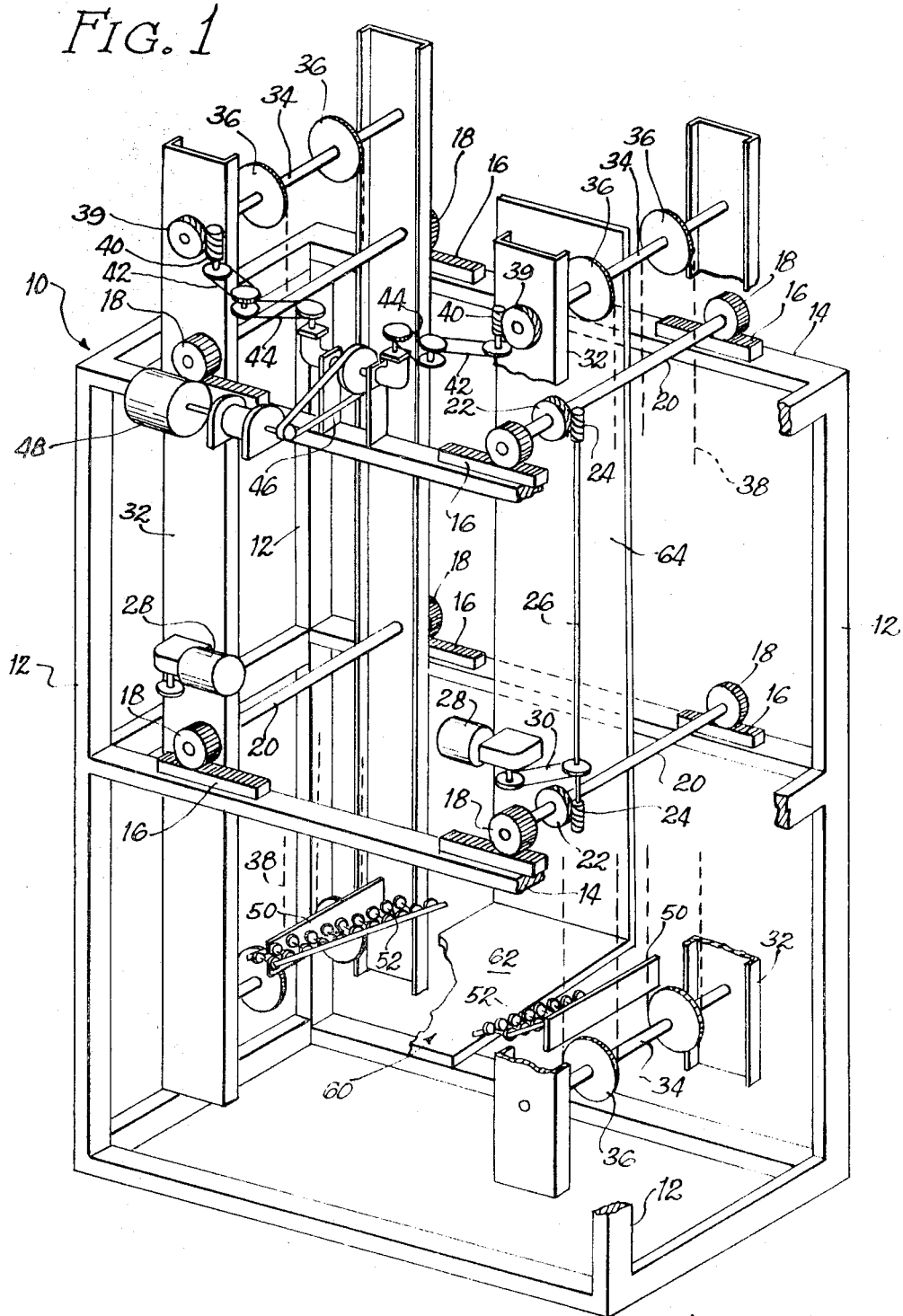

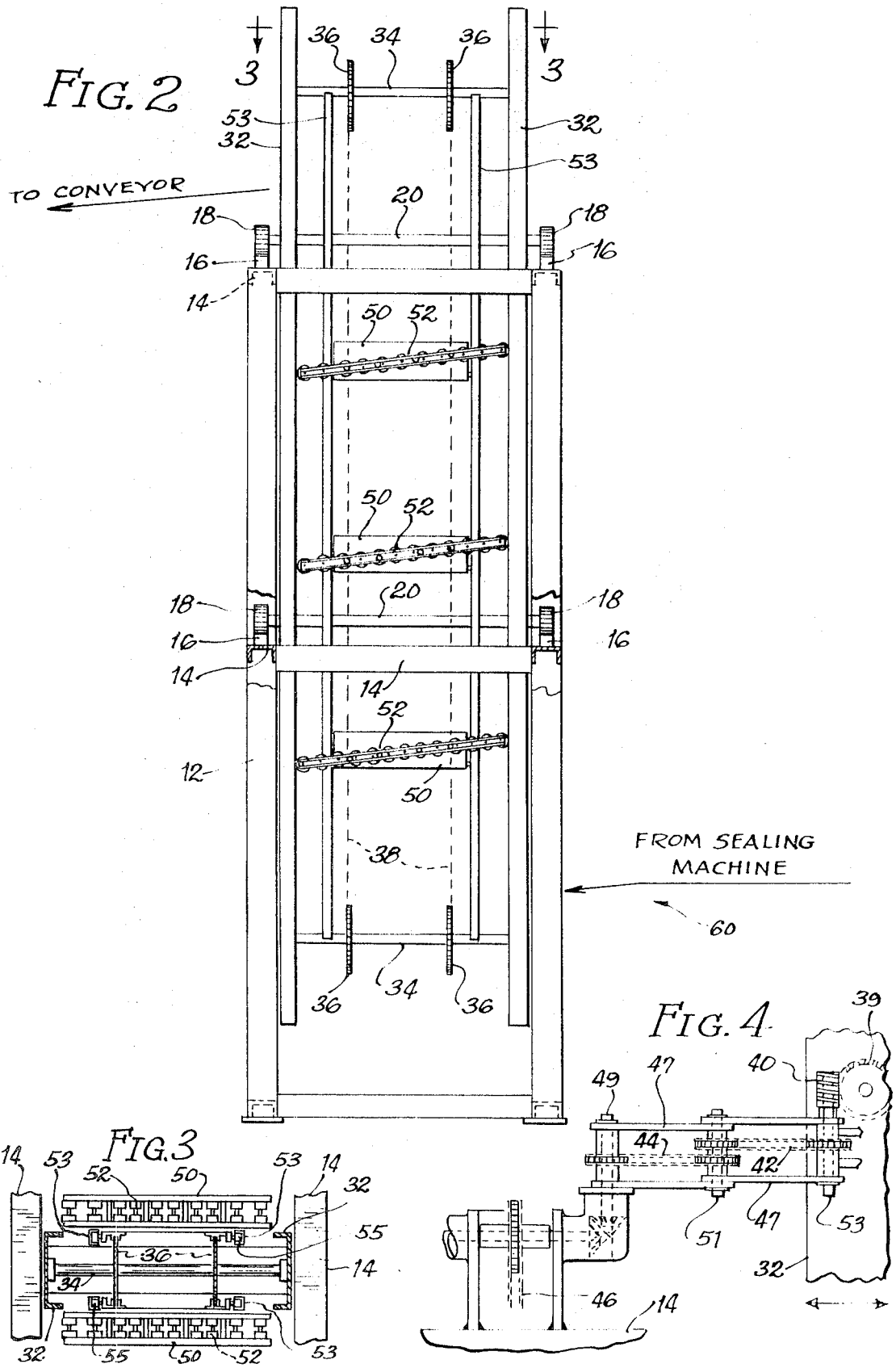

VERTICAL LIFT

This invention relates to a vertical lift constriction particularly suitable for conveying articles from one level to another. In the following description, reference will be made to the transporting of articles from a lower level to an upper level; however, it will be appreciated that the structure of the invention is also completely suitable for transporting articles from an upper level to a lower level.

In article handling operations, for example in manufacturing plants, it is often necessary to move articles from one floor to another. For example, articles coming off an assembly line may be packaged and then moved to a loft for storage purposes. A variety of lift constructions have been developed which will accomplish the desired results. It has been found, however, that such lift constructions have certain disadvantages from the standpoint of initial expense and from the standpoint of versatility in handling articles of different sizes.

It is a primary object of the instant invention to provide a vertical lift construction which is characterized by a relatively straightforward design so that the construction can be manufactured and maintained with a high degree of efficiency.

It is a more specific object of this invention to provide a lift construction which is characterized by a unique arrangement for supporting articles during movement of the articles from one level to another and which is characterized by means for easily adjusting the construction so that articles of different sized can be handled.

These and other objects of this invention will appear hereinafter and for purposes of illustration, but not of limitation, specific embodiments of the invention are shown in the accompanying drawings in which:

FIG. 1 is a perspective view illustrating the apparatus of the invention;

FIG. 2 is a side elevational view of the apparatus shown in FIG. 1;

FIG. 3 is a horizontal, fragmentary, sectional view taken about the line 3–3 of FIG. 2; and, FIG. 4 is a detail fragmentary view of a drive connection employed between stationary and movable frame members.

The construction of this invention consists of a pair of opposed frames having endless conveyor means attached thereto. The conveyor means may comprise endless chains having article supporting roller beds fixed at intervals along the length of the chains. These roller beds comprise relatively narrow supports upon which the ends of articles to be conveyed will rest during the lifting operation. The main body of each article is suspended between the roller beds during the lifting operation so that no actual support is provided between the roller beds.

The frames which support the conveyor means are relatively movable so that the span between the frames can be varied in accordance with the size of the articles to be handled in the construction. The frames are motorized so that very rapid adjustment can be accomplished greatly simplifying the operation of the construction.

The embodiment of the invention shown in the drawings comprises a main frame 10 which includes vertically extending corner posts 12 and horizontally extending frame members 14. The construction shown is rectangularly shaped, and the size can be varied considerably, depending upon the type of articles being handled.

Eight racks 16 are supported on the upper and intermediate transverse frame members 14. Pinions 18 engage the racks, each pair of pinions being connected to a common shaft 20.

A gear 22 is tied to each shaft 20, and drive pinions 24 secured to rods 26 engage the gears 22. The rods 26 are adapted to be rotated by means of motors 28 which drive the belts 30.

The shafts 20 are received in openings defined by vertically extending conveyor frame members 32. The upper and lower ends of the members 32 are unconnected relative to any other structural elements so that the wall support for these frame members is provided by the pinions 18 resting on the racks 16.

Each pair of frame members 32 supports upper and lower shafts 34, and each shaft carries a pair of sprockets 36. Endless conveyor chains 38 are carried by the sprockets.

One end of each upper shaft 34 carries a gear 39 which meshes with a drive pinion 40. Each pinion 40 is driven by means of a pair of chains 42 and 44, and these chains are in turn driven through main belt 46 which is connected to the motor 48.

As will be discussed, the frame members 32 are adapted to move relative to the transverse members 14. To achieve this, while maintaining the drive chains 42 and 44 in position, links 47 are preferably employed (FIG. 4). The shafts 49, 51 and 53 associated with the chain sprockets fit within openings in the links and the shafts are free to move in these openings. As the frame members 32 move, the links will maintain the spacing between the shafts.

The conveyor chains 38 carry a plurality of plates 50 with each plate supporting a narrow roller bed section 52. As best shown in FIG. 2, the plates and roller bed sections are located at spaced intervals on the chains 38, and the movement of the conveyors is synchronized so that plates on the respective flights will be maintained at the same level in the course of their movement. Channel members 53, shown in FIGS. 2 and 3, may be provided for receiving rollers 55 attached at the ends of the plates to thereby hold the plates and associated roller beds in line during vertical movement.

In a typical use of the construction, packages may be transported from a sealing machine to the lower level 60. When moved into the confines of the construction, the packages will be picked up by roller assemblies 52 so that the opposite ends of the package will be supported while the main body of the package will be supported during movement from a lower level to an upper level. To facilitate loading of the apparatus, a platform 62 may be provided for supporting the package until the next pair of roller assemblies moves into position. The roller assemblies are inclined toward the back side of the construction, and an upright barrier 64 is situated so that the packages will not move out of the construction until they reach the upper level.

The package carried by the rollers may be automatically discharged when the package has moved past the upper extent of the barriers 64. On the other hand, suitable pusher means could be employed to insure removal of a package.

Whenever different carton sizes or different types of goods are to be handled by the construction, the motors 28 can be energized to change the spacing between the upright frames 32. In order to accomplish this without losing driving engagement between the pinions 40 and gears 38, the double pulleys joining the belts 42 and 44 may be spring mounted for movement back and forth depending upon the tension applied by the belts. Suitable support means of a conventional nature may be utilized for accomplishing this end.

In order to avoid continuous operation of the apparatus, detecting means may be employed with a view toward shutting off the apparatus when there are no articles on the roller beds. For example, an electric eye may be situated at the bottom of the construction adjacent the barrier 64, and a photoelectric cell located at the top so that the presence of a package or other article on the roller beds will be detected. The motor 48 will then operate as long as the beam to the photoelectric cell is interrupted. A microswitch may also be positioned adjacent the face of the barrier 64 to detect the presence of a package for commencing operation of the drive motor 48.

It will be understood that various changes and modifications may be made in the above described construction which provide the characteristics of this invention without departing from the spirit thereof particularly as defined in the following claims.

That which I claim is:

1. An article handling construction for moving articles vertically from one level to another comprising opposed upright frame members, a surrounding main frame structure, means connecting said upright frame members to said main frame structure whereby said upright frame members are suspended within said main frame structure and supported by said main frame structure, endless conveyor means carried by each of said frame members, each of said conveyor means carrying a plurality of article supporting elements located at spaced intervals thereon, and drive means for said conveyor means, each article supporting element on one of the conveyor means being located in opposed, transversely spaced relation ship with a corresponding article supporting element on the other conveyor means during movement of the article supporting elements along the inwardly facing sides of the conveyor means, said article supporting elements engaging articles at the ends of the articles with the remaining portions of the articles being suspended, unsupported between the article supporting elements, and including additional drive means mounted between said main frame structure and said upright frame members, said additional drive means operating to provide relative movement between said upright frame members to vary the spacing between the upright frame members.

2. A construction in accordance with claim 1 wherein said article supporting elements comprise inclined roller beds.

3. A construction in accordance with claim 2 wherein the article supporting elements are employed for lifting articles vertically from a lower level to an upper level, a loading station located on one side of the construction at said lower level, and a discharge station located on the other side of the construction at said upper level, said inclined roller beds having their raised ends on said one side of the construction in the course of upward movement, and including means for retaining articles in position on said roller beds as said articles are moved from said lower level to said upper level.

4. A construction in accordance with claim 3 wherein said means for maintaining the articles in position comprise stop means located on said other side of the co construction and extending from said lower level to said upper level.

5. A construction in accordance with claim 1 wherein said conveyor means comprise endless chains, sprockets for carrying the chains and for imparting driving movement thereto, and brackets attached at spaced intervals to said chains for holding said article supporting elements.

6. A construction in accordance with claim 1 wherein said additional drive means are supported by said surrounding main frame and said upright frame members, said additional drive means serving as the means for connecting said upright frame members to said main frame.

7. A construction in accordance with claim 6 wherein said additional drive means include pinions carried by said upright frame members and rack means mounted on said main frame for engagement by said pinions.

8. A construction in accordance with claim 7 wherein said main frame includes a plurality of transversely extending members at different levels of the construction, said racks being located on said members transversely extending and wherein the pinions engaging said racks serve to hold the upright frame members and associated conveyor means in suspended relationship relative to said main frame.